(12) United States Patent
Berlinecke et al.

(10) Patent No.: US 11,904,474 B2
(45) Date of Patent: Feb. 20, 2024

(54) METHOD FOR ASSEMBLING A COLLECTION OF COMPONENTS, AND CORRESPONDING SYSTEM

(71) Applicant: Fairchild Fasteners Europe—VSD GmbH, Hildesheim (DE)

(72) Inventors: Birte Berlinecke, Hildesheim (DE); Jan Dohmeyer, Gehrden (DE); Jurgen Rosing, Sehnde (DE); Torsten Timpe, Hildesheim (DE)

(73) Assignee: Fairchild Fasteners Europe—VSD GMBH, Hildesheim (DE)

( * ) Notice: Subject to any disclaimer, the term of this patent is extended or adjusted under 35 U.S.C. 154(b) by 418 days.

(21) Appl. No.: 17/414,734

(22) PCT Filed: Dec. 17, 2019

(86) PCT No.: PCT/EP2019/085516
§ 371 (c)(1),
(2) Date: Jun. 16, 2021

(87) PCT Pub. No.: WO2020/127175
PCT Pub. Date: Jun. 25, 2020

(65) Prior Publication Data
US 2022/0063093 A1    Mar. 3, 2022

(30) Foreign Application Priority Data

Dec. 19, 2018 (EP) .................................. 18214264

(51) Int. Cl.
*G06V 20/80* (2022.01)
*B25J 9/16* (2006.01)
*B64F 5/10* (2017.01)
*B62D 65/02* (2006.01)

(52) U.S. Cl.
CPC .......... *B25J 9/1653* (2013.01); *B25J 9/1684* (2013.01); *B25J 9/1697* (2013.01); *G06V 20/80* (2022.01); *B62D 65/02* (2013.01); *B64F 5/10* (2017.01)

(58) Field of Classification Search
CPC ...... B25J 9/1653; B25J 9/1684; B25J 9/1697; G06V 20/80; G06V 20/10; B62D 65/02; B64F 5/10
USPC ........................................................ 382/190
See application file for complete search history.

(56) References Cited

U.S. PATENT DOCUMENTS 8,180,174 B2   5/2012  Kutter et al.
2008/0077511 A1*  3/2008  Zimmerman ........ G06Q 10/087
                                                           705/28

OTHER PUBLICATIONS

Takahashi Toru et al., "Mass-produced parts traceability system based on automated scanning of 'Fingerprint of Things'," 2017 Fifteenth IAPR International Conference on Machine Vision Applications (MVA), MVA Organization, May 8, 2017, pp. 202-206.

(Continued)

*Primary Examiner* — Stephen P Coleman
(74) *Attorney, Agent, or Firm* — Boardman & Clark LLP

(57) ABSTRACT

Disclosed is a method and a system or assembling a collection of components, in particular a user-specific collection of components used in aviation and astronautics or in the automobile industry or other industries, wherein a collection of multiple components is assembled in a packaging unit or in a tray, and each of the individual components of the collection of components is assigned an identifier which allows the corresponding component to be tracked.

10 Claims, 1 Drawing Sheet

(56) References Cited

OTHER PUBLICATIONS

International Search Report and Written Opinion of the International Searching Authority dated Mar. 24, 2020 (translated) for PCT/EP2019/085516 filed Dec. 17, 2019, 5 pages.
International Preliminary Report on Patentability dated Jun. 24, 2021 (translated) for PCT/EP2019/085516 filed Dec. 17, 2019, 6 pages.

* cited by examiner

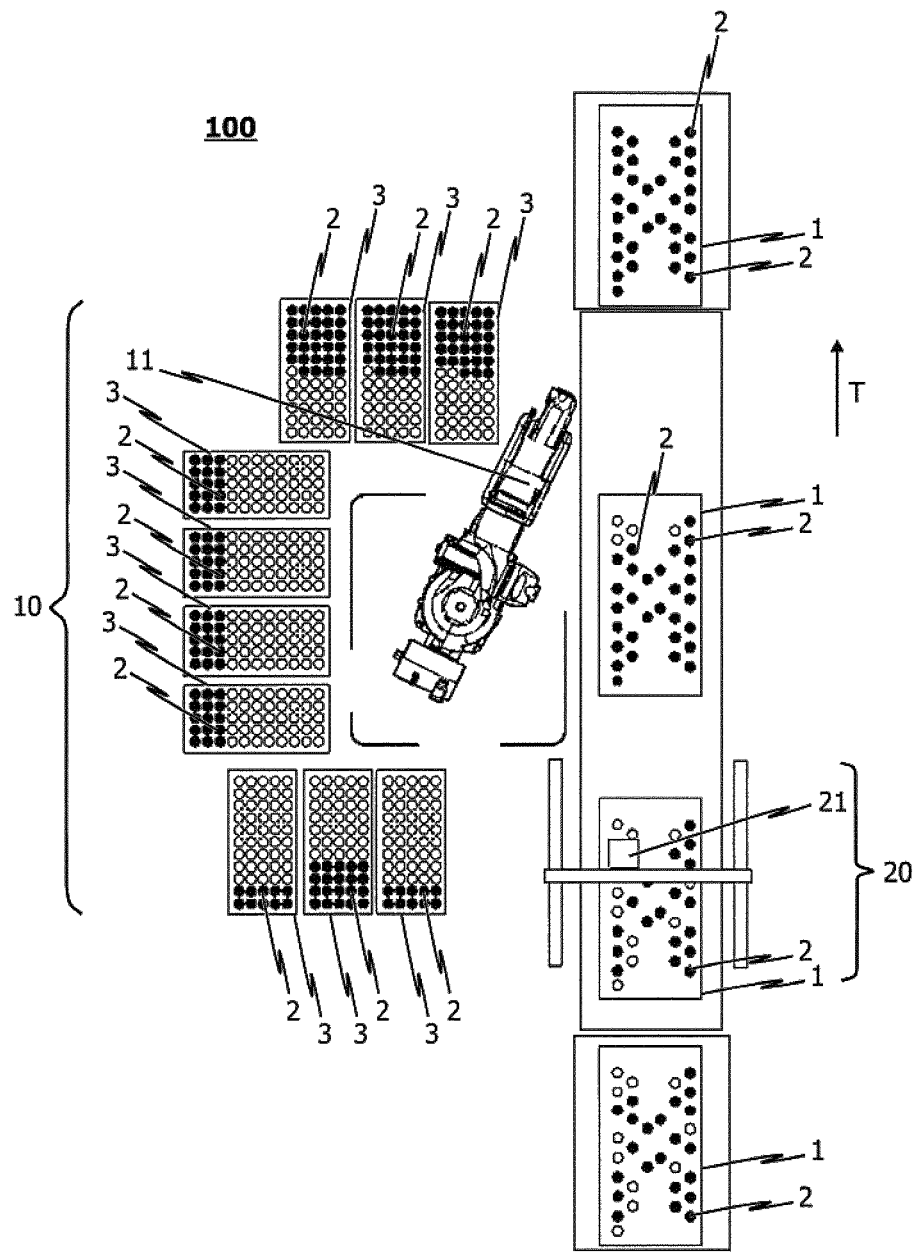

METHOD FOR ASSEMBLING A COLLECTION OF COMPONENTS, AND CORRESPONDING SYSTEM

CROSS-REFERENCE TO RELATED APPLICATIONS

This application is a national phase filing of International Patent Application No. PCT/EP2019/085516, entitled "METHOD FOR ASSEMBLING A COLLECTION OF COMPONENTS, AND CORRESPONDING SYSTEM," which has an international filing date of Dec. 17, 2019, and claims priority to European Patent Application No. 18214264.6 filed Dec. 19, 2018, the entire contents of each of which is hereby incorporated herein by reference for all purposes.

The present invention relates in general to a method of compiling collections of components. In particular, the invention relates to a method for compiling user-specific collections of components as used during assembly in the aeronautics and aerospace or the automotive or other industries.

According to embodiments of the invention, this relates for example to the component supply of a pick-and-place machine such as a pick-and-place robot, for example, or the component supply of a manual workstation in which components are manually mounted.

According to other embodiments, the invention relates to a method for compiling a collection of components, wherein a collection of multiple components is compiled into a packaging unit.

According to other embodiments, the invention relates to the providing of component trays as used in particular during assembly in the aeronautics and aerospace or the automotive or other industries. The trays generally thereby used are trays having appropriate recesses into which the components are inserted. It is thereby common for a tray to accommodate different types of components, particularly when various different components are needed in the subsequent assembly. As a rule, the components are inserted into the tray in a type-specific manner within designated areas of the tray.

For the initial filling of a tray, the components are taken from defined production lots and inserted into the receptacles provided in the tray for the components.

The tray thusly prepared is then supplied to the pick-and-place machine or the manual assembly station. The individual components are thereby taken from the tray and the tray thus partially or completely emptied over the course of assembly.

The tray is then accordingly fit with components again in a component supply station. The tray is to likewise be refilled from defined production lots. The component supply station is usually located at the component supplier whereas the assembly; i.e. the removal of the components from the tray, takes place at the supplier's customer.

The disadvantage of the method normally used to date at the component supply station or component supplier respectively for preparing trays subsequently used during assembly in the aeronautics and aerospace or the automotive or other industries is that the supplier cannot determine with certainty that—when not all the components are removed from the tray during assembly—the components which remain in the tray have been put back in the tray in the right places. Particularly problematic is that lot traceability is not practically feasible with the conventional method for preparing trays.

The same also applies in a figurative sense to the compiling of user-specific collections of components used during assembly in the aeronautics and aerospace or the automotive or other industries.

On the basis of this problem as set forth, the present invention is based on the task of specifying an optimized method for compiling a collection of components, particularly a user-specific collection of components as used during assembly in the aeronautics and aerospace or the automotive or other industries, wherein a reliable identification and authentication of the individual components of the component collection is provided.

A further task of the invention is that of providing an optimized method for the preparing of trays used during assembly in the aeronautics and aerospace or the automotive or other industries as well as a corresponding apparatus, wherein a reliable identification and authentication of the individual components with which a prepared tray is equipped is provided.

With regard to the method, this task is inventively solved by the subject matter of independent claim 1 and with regard to the apparatus, by the subject matter of accompanying independent claim 15, whereby advantageous further developments are specified in the respective dependent claims.

Accordingly, the invention relates in particular to a method for compiling a collection of components, in particular a user-specific collection of components as used during assembly in the aeronautics and aerospace or the automotive or other industries, wherein a collection of multiple components is compiled into a packaging unit or into a tray, and wherein each of the individual components of the component collection is assigned an identifier enabling the corresponding component to be tracked.

According to embodiments of the invention, this relates in particular to a method for the preparing of trays used during assembly in the aeronautics and aerospace or the automotive or other industries, whereby a provided tray is equipped with components and whereby each of the components with which a tray is equipped is assigned an identifier which enables the corresponding component to be tracked.

Assigning the individual components in the collection of components a corresponding identifier achieves flawless component traceability for quality management. In particular, similar components stemming from different manufacturing processes can also be flawlessly differentiated at a later point in time. It is furthermore possible to verify the production lot of the components with which for example a tray is/was equipped, particularly for warranty purposes. Additionally thereto, it is possible to identify OEM parts and unauthorized copies. In addition to the identifying of a component as such, a production lot can also be identified.

Various methods are possible for assigning a corresponding identifier to the components. Conceivable for example is providing the components with a fluorescent marking as proposed in the WO 2011/101001 A1 printed publication.

Alternatively thereto is assigning a transaction watermark to each component. A transaction watermark is generally understood as a transparent imperceptible pattern introduced into data material (here: the component to be identified) with an embedding algorithm using a secret key.

Using RFID tags, data matrix codes or even chemical markers for identification purposes is further known, particularly in the case of high-priced parts/components.

However, these approaches as used to date to identify parts or components are not suitable for mass-produced components, particularly screws or bolts, even though seamless traceability of the production history makes sense here as well.

Once the components have namely been mounted, even a screw costing just a few cents can compromise the functionality and longevity of a complex and expensive end product. For small, price-sensitive components such as screws or bolts for the aeronautics and aerospace industry or for the automotive industry, tags or special markings are often too expensive or technically infeasible.

As a result, it is difficult to trace individual components of complex products, in particular small, price-sensitive components, particularly in highly networked production chains and global supply chains.

Taking this problem into account, one aspect of the present invention provides for using a surface microstructure of the respective component as a differentiating factor in assigning the identifier. This approach enables distinct recognition (authentication) of the components in a provided tray equipped with the respective components. Each component put back into the tray again during assembly can thus also be distinctly identified and, if necessary, sorted out or repositioned in the tray.

The technology is based on the fact that the respective components have an individual microscopically distinctive surface structure or color texture. A defined area of the component is selected and in each case recorded in high resolution by a camera. A numeric characteristic is calculated from the acquired image of the specific surface microstructure and its position and assigned an identifier. This pairing is stored in a database, preferably together with other data such as e.g. measurement or manufacturing data. The entire process is repeated for later identification and a data reconciliation returns the identifier and optionally other individual characteristics of the component.

Metal components are particularly suitable for this type of stochastic "fingerprint," whereby even with lot sizes of several hundreds of thousands of pieces, the individual components can be distinctly identified in seconds, thereby enabling component-related data assignment in the production cycle.

Since no additional markers or IDs are affixed to the product, this system is forgery-proof. The fact that no quantity-dependent costs are incurred makes the system economically viable, particularly also for mass-produced components.

In the inventive method, the identifier is either assigned after the tray has been fit with the respective component or before the tray is fit with the respective component, and in particular during or following the component's production.

Conceivable in this context is for the provided tray to be completely empty prior to being filled. Alternatively thereto, the inventive method can also be used in situations in which prior to being fitted, the provided tray is partially equipped with components from an earlier fitting, whereby a surface microstructure of the respective component is used as the differentiating factor in assigning the identifier.

For the assembly of a component from the equipped tray, the respective component is removed from the tray, whereby a defined area of the component is selected and recorded in high resolution so as to track the component taken from the tray. A numeric characteristic is calculated from the acquired image of the specific surface microstructure and its position and assigned a component identifier.

The components considered here are in particular connecting elements made of metal, in particular titanium, aluminum, steel, nickel and corresponding alloys thereof, whereby these connecting elements are used in particular in the aeronautics and aerospace and/or automotive industries.

The present invention further relates to an apparatus in accordance with accompanying independent claim 15 for compiling a collection of components, particularly a user-specific collection of components as used during assembly in the aeronautics and aerospace or the automotive or other industries.

This apparatus is particularly suitable also for preparing trays used for example during assembly in the aeronautics and aerospace or the automotive industry, wherein the apparatus comprises a component supply station in which the individual trays required for the assembly are preferably equipped with the corresponding components in automated or manual manner.

On the assembly side, a pick-and-place machine is for example used, e.g. a pick-and-place robot, same taking the components out of the tray and mounting them accordingly. It is however also optionally conceivable on the assembly side for the components to be manually taken from the tray and mounted (manual workstation).

The component supply station of the inventive apparatus is assigned a system for the distinctive identifying and tracking of the components accommodated or to be accommodated in the trays.

To track a component removed from the tray or track a component removed from the tray and then perhaps put back into the tray, a defined area of the component is selected and recorded in high resolution. A numeric characteristic is calculated from the acquired image of the specific surface microstructure and its position and assigned a component identifier, wherein data reconciliation in a database, in which the calculated characteristic and the assigned component identifier are stored as a pairing for each component, returns the component identifier and preferably other individual characteristics of the component.

In describing the invention in greater detail, the following references the accompanying drawing of an exemplary embodiment of the apparatus for preparing corresponding trays.

Shown is:

FIG. 1 a schematic view of an exemplary embodiment of the inventive apparatus for preparing trays used during assembly in the aeronautics and aerospace or the automotive industry.

The inventive solution is based on the problem of the quality of complex industrial products depending particularly on the quality of each individual component. A single defective component such as a connecting element (screw, bolt, etc.), for example, can compromise the functionality and longevity of a complex structure. If the assembled (defective) component fails a functional check, the entire product along with all its mounted semi-finished parts is usually rejected. This results in high costs, wherein at the same it usually cannot be verified where exactly the malfunction is which led to the failure of the component during the functional check.

The present invention thus provides a solution with which even small components and semi-finished products can be provided with a signature so as to be able to trace them back in the value chain if possible to the very beginning. Only then can the causes of recurring manufacturing defects be identified and permanently eliminated with the help of inline inspection systems.

The inventive apparatus 100, as shown schematically in FIG. 1 in the form of an exemplary embodiment, is an apparatus 100 for preparing trays 1 used in particular during assembly in the aeronautics and aerospace or the automotive industry. This apparatus 100 comprises—as schematically indicated in FIG. 1—a component supply station 10 with a pick-and-place robot 11 by means of which the trays 1 supplied to the component supply station 10 are automatically fit with corresponding components 2 from different production lots 3. Alternatively or additionally hereto, however, it is also conceivable for a manual workstation to be provided for manually fitting the tray 1 with components 2.

The inventive apparatus 100 is in particular characterized by the trays 1 being fit with different components 2 (here: connecting elements). To that end, the pick-and-place robot 11 grasps different defined production lots 3 in order to extract the individual components 2 from said production lots 3 and insert them into the tray 1 at specific positions (recesses).

The trays 1 supplied to the component supply station 10 can be completely empty. It is however also conceivable—as indicated in FIG. 1—that prior to being fitted, the trays 1 supplied to the pick-and-place robot 11 are still partially equipped with components 2 from an earlier fitting.

As schematically indicated in FIG. 1, the apparatus 100 according to the invention comprises a system 20 for the distinctive identification, authentication and/or tracking of the components 2 set into the trays 1 by the pick-and-place robot 11 and/or the components 2 yet to be set into the trays 1 by the pick-and-place robot 11.

Alternatively or additionally thereto, a system 20 is used for the distinctive identification, authentication and/or tracking of the components 2 still in the tray 1 from an earlier equipping.

It is conceivable in this context to combine these systems together so that both tasks can be performed by a single system 20.

The system 20 for the distinctive identification, authentication and/or tracking of the components set into the trays 1 or the components to be set into the trays 1 by the pick-and-place robot 11 in particular comprises a high-resolution camera 21, by means of which defined areas of the component surface of each component 2 to be identified and/or authenticated is recorded. The high-resolution camera 21 can travel along the feeding direction T of the trays 1 such that all the components 2 set in a tray 1 can be correspondingly scanned for identification and/or authentication.

A numeric characteristic is calculated from the acquired image of the specific structure profiles and their position relative one another in an evaluation unit and stored in a database.

The entire process is repeated for later identification. Matching characteristics denote the component 2 being sought. The system 20 is designed such that a wide range of materials—from smooth plastics to precision-machined aluminum, cast iron to painted surfaces—can be recorded with one and the same hardware during the production cycle.

In particular ensured is the accordingly unique identifying of each component 2 in the tray 1 fit by the pick-and-place robot 11 for traceability. In this way, each component 2 newly inserted by the pick-and-place robot 11 is known. Components 2 which are repositioned during the assembly are likewise recognized and can be replaced or, if applicable, accepted.

The invention is not limited to the features of the exemplary embodiment according to FIG. 1 but rather yields from an integrated overall consideration of all the features disclosed herein.

The invention claimed is:

1. An apparatus for compiling a collection of components, particularly a user-specific collection of components as used during assembly in the aeronautics and aerospace or the automotive or other industries, wherein the apparatus comprises the following:
   a component supply station having component trays with corresponding components from different production lots and a pick-and-place robot for the automated compiling of a collection of multiple components into a packaging unit or into a collection tray, and
   a system for the distinctive identification, authentication and/or tracking of the components,
   wherein the system for the distinctive identification, authentication and/or tracking of the components comprises the following:
   a camera designed to select a defined area of the component and record it in high resolution for the tracking of the component, and
   an evaluation unit designed to calculate a numeric characteristic from the acquired image of the specific surface microstructure of the component and its position and assign a component ID, and wherein the evaluation unit is further designed to return the component ID and preferably further individual characteristics of the component via data reconciliation in a database in which the calculated characteristic and assigned component ID is stored as a pairing for each component.

2. A method for compiling a collection of components, particularly a user-specific collection of components as used during assembly in the aeronautics and aerospace or the automotive or other industries in an apparatus according to claim 1, wherein a collection of multiple components is compiled into a packaging unit or into a tray, and wherein each of the individual components of the component collection is assigned an identifier enabling the corresponding component to be tracked,
   wherein to compile the component collection, a provided packaging unit or provided tray is fit with components, and wherein each of the components with which the packaging unit or the tray is equipped is assigned an identifier enabling the corresponding component to be tracked.

3. The method according to claim 2,
   wherein the identifier is assigned after the packaging unit or the tray has been equipped with the respective component.

4. The method according to claim 2,
   wherein prior to the collection being compiled into the packaging unit or the tray same is completely empty; or
   wherein prior to the collection being compiled into the packaging unit or the tray, same still comprises some components from a previously compiled collection, and wherein each component of the earlier collection is assigned a corresponding identifier.

5. The method according to claim 4,
   wherein to identify a component of an earlier collection, a surface microstructure is recorded in high resolution at a predefined or definable component position and a characteristic bit sequence is generated based on the recorded surface microstructure via which the identifier of the component is determined.

6. The method according to claim 2, wherein each component ID is assigned further information, in particular data obtained over the course of or subsequent to component production, particularly technical specification data.

7. The method according to claim 2, wherein for the assembly of a component of the collection compiled in the packaging unit or tray, same is removed from the packaging unit/tray, and wherein for tracking the component taken from the packaging unit/tray, a defined area of the component is selected and recorded in high resolution, wherein a numeric characteristic is calculated from the acquired image of the specific surface microstructure and its position and assigned a component ID.

8. The method according to claim 7,
wherein the calculated characteristic and assigned component ID is stored for each component as a pairing in a database, preferably together with further data, particularly measurement and/or manufacturing data.

9. The method according to claim 7,
wherein for tracking the component taken from the packaging unit/tray, data reconciliation in a database in which the calculated characteristic and assigned component ID is stored as a pairing for each component returns the component ID and preferably further individual characteristics of the component.

10. The method according to claim 2, wherein the component is a connecting element made of metal, in particular titanium, aluminum, steel, nickel and/or an alloy thereof, as used in the aeronautics and aerospace and/or automotive industries.

* * * * *